United States Patent [19]

Stemme

[11] Patent Number: 4,843,445
[45] Date of Patent: Jun. 27, 1989

[54] INTEGRATED SEMICONDUCTOR CIRCUIT AND METHOD FOR PRODUCING IT, AND USE OF SUCH A CIRCUIT FOR PROVIDING A FLOW METER

[75] Inventor: Nils G. Stemme, Gothenburg, Sweden

[73] Assignee: Swema Instrument Aktiebolag, Farsta, Sweden

[21] Appl. No.: 14,063

[22] PCT Filed: May 20, 1986

[86] PCT No.: PCT/SE86/00233
§ 371 Date: Jan. 16, 1987
§ 102(e) Date: Jan. 16, 1987

[87] PCT Pub. No.: WO86/07192
PCT Pub. Date: Dec. 4, 1986

[30] Foreign Application Priority Data
May 21, 1985 [SE] Sweden .................... 8502479

[51] Int. Cl.⁴ .................. H01L 23/56; H01L 29/66
[52] U.S. Cl. ......................... 357/28; 357/25; 357/68; 374/54; 73/204.26
[58] Field of Search .............. 357/28, 68, 25, 75; 374/54, 29, 44, 135; 73/204.26; 324/92, 453

[56] References Cited

U.S. PATENT DOCUMENTS 4,246,595  1/1981  Noyori et al. ............... 357/69 X
4,472,239  9/1984  Johnson et al. .............. 374/54 X
4,500,905  2/1985  Shibata ....................... 357/68

OTHER PUBLICATIONS

Dobkin, R. C., "On-Chip Heater . . . ", Electronics, Sep. 16, 1976, pp. 106–112.
Mukai, K. et al, "Planar Multi-Level Interconnection . . . ", IEEE Jour. of Solid-State Circuits, vol. SC-13, Aug. 1978, pp. 462–467.

Primary Examiner—Andrew J. James
Assistant Examiner—Sara W. Crane
Attorney, Agent, or Firm—Beveridge, DeGrandi & Weilacher

[57] ABSTRACT

An integrated semiconductor circuit including at least two mutually separated wafer parts (3, 4) of semiconductor material and conductors (7) for establishing electrical conection between the wafer parts is disclosed with a thermally insulating jointing substance (9) which is applied across the gap between the wafer parts (3, 4) for holding these parts together. The jointing substance (9) is mechanically supporting for holding the wafer parts (3, 4) together, and the conductors (7) are so dimensioned that they have a negligible supporting function as compared with the jointing substance (9). A method for producing such a cirucit and the use of the circuit for providing a flow meter for measuring the flow velocity of a flowing gaseous or liquid medium are also disclosed.

9 Claims, 2 Drawing Sheets

INTEGRATED SEMICONDUCTOR CIRCUIT AND METHOD FOR PRODUCING IT, AND USE OF SUCH A CIRCUIT FOR PROVIDING A FLOW METER

BACKGROUND OF THE INVENTION

The present invention generally relates to an integrated semiconductor circuit and a method of producing it, said circuit comprising at least two mutually separated wafer parts of semiconductor material, and conductors for establishing electrical connection between the wafer parts which are substantially thermally insulated from each other.

The invention further relates to the use of such an integrated semiconductor circuit for providing a flow meter for measuring the flow velocity of a flowing gaseous or liquid medium, said flow meter being particularly characterized in that it comprises two mutually separated wafer parts one of which is adapted to be heated and disposed in the flow and the other of which is also adapted to be disposed in the flow, however without being heated, the flow velocity of the medium being calculated on the basis of the dissipation by thermal convection of the first wafer part to the ambient flowing medium.

Since the invention is especially well suited for providing flow meters or flow sensors of the above-indicated type, the following description will be directed to the use of the integrated semiconductor circuit and the method of producing it especially for such sensors, but it is evident to anyone skilled in the art that this is not the only field of application of the invention which may also be used in all integrated circuits where it is desirable to achieve thermal insulation between different parts of a semiconductor circuit and electrical connection between the parts.

In semiconductor technology, a large number of integrated transducers or sensors of semiconductor material have been developed lately, such as temperature and flow sensors, which are manufactured along the same principles as conventional integrated circuits, i.e. are built up on a layer of monocrystalline semiconductor material on which the electric components and conductors required for the operation of the sensor have been integrated according to known techniques. In addition to the small size of the sensor and the reduced costs of manufacture of the sensor per se, achieved by producing several identical units at a time (batch process), a further advantage is gained, namely that the signal processing electronic circuits or equivalent components associated with the sensor can be directly integrated on the sensor in connection with the manufacture thereof, which further reduces the cost of the sensor and enhances its reliability. The measuring performance of the entire system is also improved by directly integrating the signal processing electronic circuits on the sensor. A first signal gain can then be achieved closer to the measuring unit proper, which prevents weak signals from disadvantageously being fed over long signal paths.

A known flow velocity sensor of this type comprises a thin, narrow silicon beam, a base plate fixedly connected to one end of the silicon beam and carrying bonding pads required for the operation of the sensor, and a sensor part, also of silicon, fixedly connected to the other end of the silicon beam. For using the sensor, said other end of the beam is inserted through a tube wall or the like into a flow of gas or liquid, the velocity of which should be measured, so as to place the sensor part in the flow. The mode of operation of the sensor, which is based on known techniques, is as follows. The sensor part is electrically heated by means of a resistor integrated thereon, to an upper temperature, whereupon the sensor part is allowed to cool to a lower temperature as a result of the dissipation by thermal convection, it being possible to repeat this process cyclically. Both the heating time and the cooling time are indicative of the flow velocity of the medium. A first temperature-sensitive diode for compensating for temperature variations in the medium is integrated in the silicon beam, and a second temperature-sensitive diode is integrated in the sensor part, it being possible by means of this second diode and the resistor to provide a temperature feedback control system for controlling the temperature of the sensor part.

In order to achieve accurate flow measurements with the flow sensor described above, it is obviously desirable that the sensor part be thermally insulated from the silicon beam, such that the temperature of the sensor part is substantially affected by the dissipation by thermal convection because of the flow and not because of thermal conduction between the sensor part and the beam.

To this end, the circuit in the above-mentioned previously known flow sensor has been formed into two physically separated units or wafer parts which are held together only by the conductors extending between the wafer parts (sensor part and beam) and also providing an electrical connection between the wafer parts. This solution however suffers from a serious drawback. So that the conductors should have a sufficient supporting capacity, i.e. in order that the beam in the above-described flow sensor should be able to support the sensor part, they must have a relatively large thickness, which means a large conductor cross-sectional area in the joint between the sensor part and the beam and, thus, entails undesired thermal conduction by the conductors from the sensor part to the beam, which in turn adversely affects the sensitivity and speed of the sensor device. If the conductors are made thinner to prevent such undesired thermal transfer between the sensor part and the beam, the sensor device will become more vulnerable to impacts and more easily damaged. There is also a risk that a sensor device of the above-defined type will be damaged because of the pressure from the ambient flowing medium.

SUMMARY OF THE INVENTION

In order to solve the problem outlined above, the present invention has provided an integrated semiconductor circuit of the type mentioned in the introduction to the specification, in which a thermally insulating jointing substance is applied across the gap between the wafer parts for holding these together. The jointing substance then preferably is mechanically supporting for providing a strong bond between the wafer parts, and the conductors are preferably so dimensioned that they have a negligible supporting function as compared with the jointing substance. Thus, this construction will overcome the above-mentioned problem and achieve the above-mentioned object, i.e. provide thermal insulation between the wafer parts, electrical connection therebetween and mechanical interconnection thereof.

In a preferred embodiment of the semiconductor circuit according to the invention, the jointing substance is so applied in the gap between the opposing narrow sides of the wafer parts that the wafer parts and the jointing substance form a unit of substantially uniform thickness, and the conductors consist of flat metal conductors extending between the wafer parts and, optionally by an oxide applied to the conductors, directly engaging the jointing substance.

In addition to the above-mentioned supporting function, the jointing substance may also have a protective function. To this end, the jointing substance, apart from being applied in the gap, is also applied as a thin protective layer over the conductors and, optionally, on part of one flat side of the wafer parts.

The jointing substance, which may be any thermally insulating and preferably mechanically supporting material, preferably consists of an organic material, such as polyimide, which is a most heat resistant and mechanically strong material.

When using the integrated semiconductor circuit according to the invention for making a flow meter of the type described above, the beam and the sensor part are held together by means of said thermally insulating jointing substance such that the sensor part is supported by the beam by the intermediary of the jointing substance. The sensor part is electrically heated through said conductors, the total cross-sectional area of which in the gap between the sensor part and the beam is limited for restricting losses by thermal conduction of the sensor part to the beam, via the conductors.

In order to produce the integrated semiconductor circuit described above, the present invention provides a method therefor, in which the circuit is first integrated with optional components and said conductors applied in a desired pattern on the front side of the circuit. The method of the invention is characterized by the steps of providing a layer applied to the backside of the circuit, removing the semiconductor material in the gap or gaps between the desired wafer parts, whereby these parts are held together substantially by means of said backside layer and whereby the conductors form bridges over the gap or gaps between the wafer parts, and applying the thermally insulating jointing substance over the gap or gaps.

By using the backside layer, which may consist of a silicon dioxide or a metal, two advantages are gained. First, the layer serves to hold the wafer parts together in that step of manufacture where the semiconductor material in the gap or gaps has been removed and the jointing substance has not yet been applied in the gap. Secondly, in the case where the jointing substance is applied to the circuit from above, the backside layer prevents the jointing substance from contacting the backside of the circuit. After the application of the jointing substance, the backside layer can be removed, whereupon the jointing substance alone will hold the respective wafer parts together.

BRIEF DESCRIPTION OF THE DRAWINGS

The invention will now be described in greater detail hereinbelow with reference to a particularly preferred embodiment of an integrated multi-part flow meter which is based on the integrated semiconductor circuit according to the invention, and to a preferred method of producing the semiconductor circuit according to the invention.

In the accompanying drawings, to which reference is now made.

DETAILED DESCRIPTION OF THE PREFERRED EMBODIMENT

Figure 1:
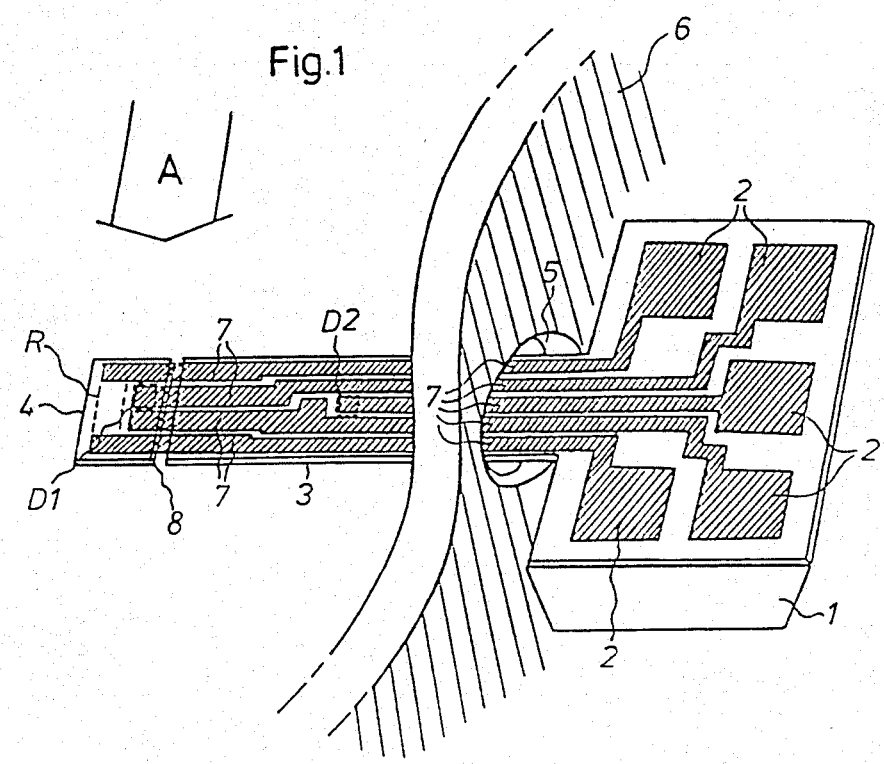
FIG. 1 is a perspective view of a gas flow meter of a known design, in which the different semiconductor wafer parts are only held together by means of conductors.

The known gas flow sensor or meter as shown perspective in FIG. 1 is made up of three main parts, namely a base plate 1 having five electrical bonding pads 2 which are applied to the front side of the base plate and by means of which the sensor can be connected to external circuits and drive means, a silicon beam 3 extending from the base plate 1 and having a thickness in the order of 30 $\mu$m, and a sensor part 4 in the form of a small silicon chip disposed at the end of the silicon beam 3 facing away from the base plate 1. The beam 3 and the sensor chip 4 are inserted through an opening 5 in a tube wall 6 or the like defining the flow of the gas, the velocity of which should be measured by the flow sensor. As shown in the Figure, the sensor chip 4 is arranged with its flat side parallel to the direction of flow indicated by the arrow A. A resistor R and a first diode D1 are integrated on the front side of the sensor chip 4, and a second diode D2 is integrated on the front side of the silicon beam 3. These three components R, D1 and D2 are electrically connected to the bonding pads 2 by four flat metal conductors 7.

The mode of operation, which is based on a known technique, of the illustrated sensor during gas flow measurements will now be described in greater detail. The sensor chip 4 is heated by means of the resistor R to an upper temperature $T_1$ whereupon the chip as a result of dissipation by thermal convection to the ambient flowing gas will cool to a lower temperature $T_2$. This heating and cooling process can be cyclically repeated. In the measuring process, use is made of the fact that a p-n junction in silicon, i.e. diodes D1 and D2, changes its forward voltage drop by about $-2$ mV/°C. at constant current in the forward direction of the diodes. The first diode D1, which is applied to the sensor chip 4, forms together with the resistor R a temperature feedback control system for controlling the temperature of the sensor chip 4 in said cycle. The other diode D2 disposed on the silicon beam 3 is used for compensating for variations in the gas temperature. By measuring the dissipation by thermal convection from the sensor chip 4 on the basis of the different temperature and power consumption processes of the sensor chip 4 during the heating and cooling cycle, it is thus possible to obtain a measuring value of the flow velocity of the gas.

In order to achieve a high accuracy and/or sensitivity and speed of the sensor, it is obviously desirable to provide thermal insulation between the beam 3 and the sensor chip 4. In the gas flow meter of known design shown in FIG. 1, attempts have been made to solve this problem by designing the beam 3 and the sensor chip 4 as two physically separated units. The above-mentioned metal conductors 7 are then also used for mechanically holding together the two parts at the gap 8. In order to obtain a sufficient supporting capacity of the conductors, these have been reinforced by electroplating to ensure that the final thickness of the conductors has been in the order of 10 μm or more. Such a considerable thickness of the conductors has resulted in that the dissipation by thermal convection from the sensor chip 4 to the beam 3 via the conductors 7 has had a relatively great influence when measuring and calculating the gas flow velocity, this reducing the accuracy of the sensor. As a result of the larger mass of the conductors 7, the speed of the sensor is also reduced.

Figure 2:
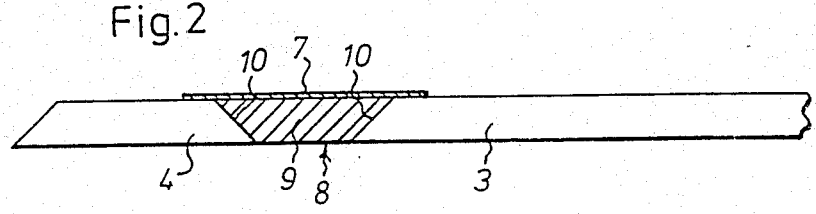
FIG. 2 is a schematic side view of a joint corresponding to the joint between the wafer parts in the flow meter of FIG. 1 but where the wafer parts are instead joined together by using the semiconductor circuit and the method according to the invention, and FIGS. 3A-3E schematically illustrate the method of the invention for producing the flow meter described in connection with FIGS. 1 and 2.

In FIG. 2, which is a side view on a larger scale of the sensor chip 4 and the beam 3, the above-mentioned problem inherent in the flow sensor described above has been solved by using the integrated semiconductor circuit and the method according to the present invention. In the illustrated embodiment of the invention, the beam 3 and the sensor chip 4 are still designed as two physically separated units, but the mechanical joining of the two parts now is not accomplished by the conductors 7, which merely serve to establish electrical connection between the beam 3 and the chip 4, but instead by means of a thermally insulating and mechanically supporting jointing substance 9 which is applied in the gap between the opposing narrow sides 10 of the beam 3 and the chip 4 in such a manner that the beam 3, the jointing substance 9 and the chip 4 form a unit of substantially uniform thickness. The thickness of the conductors 7, which now need not have any supporting function, has been reduced to about 1 μm or less in the embodiment illustrated in FIG. 2. The use of the semiconductor circuit according to the invention and the method for producing it thus provides a strong mechanical supporting connection as well as an electrical connection, without any undesired heat transfer over the gap.

The method according to the invention for producing the integrated semiconductor circuit will now be described in more detail with reference to FIGS. 3A-3E illustrating different steps in the manufacture of the flow sensor described in connection with FIGS. 1 and 2.

Figure 3A:
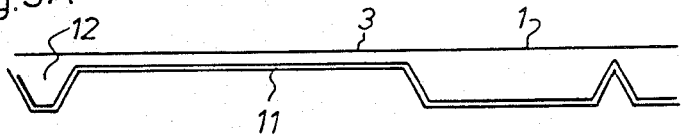
Figure 3B:
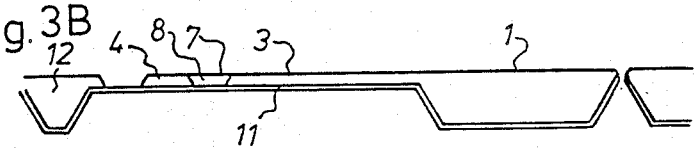

According to a known technique, the monocrystalline silicon wafer is processed, for instance by means of a crystal orientation-dependent silicon etch, into the shape illustrated in FIG. 3A. In this step, it is assumed that the conductors 7, the resistor R and the diodes D1 and D2 are integrated on the top face of the silicon wafer.

In a first step (FIG. 3A) according to the invention, there is provided a backside layer 11 consisting of a silica layer about 1 μm thick on the backside of the circuit.

Figure 3C:
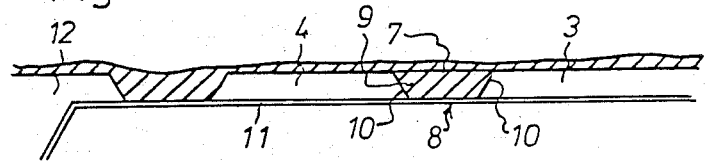
Figure 3D:
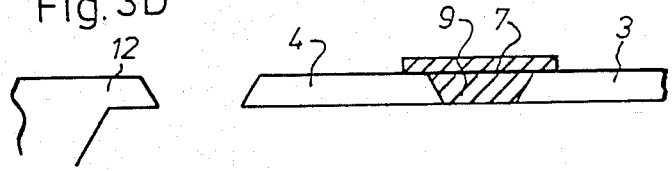
Figure 3E:
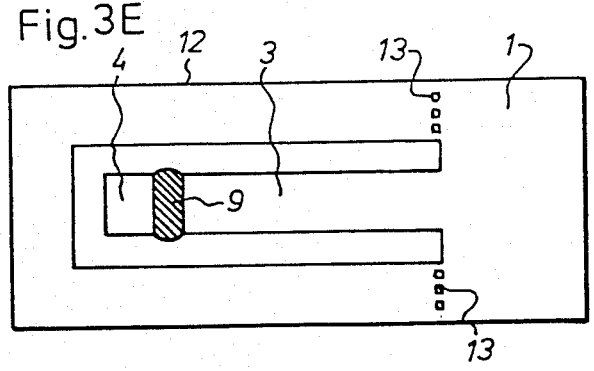

In a second step (FIG. 3B), the semiconductor material is removed by etching at the location where the joint 8 between the silicon beam 3 and the sensor chip 4 should be formed and at the edges around these two parts, the beam 3 being fixed at its end facing away from the sensor chip 4 to a supporting or protective frame 14 (see FIG. 3E). By exposing the gap, the beam 3 and the sensor chip 4 will be held together substantially by means of the backside layer 11, whereby the conductors 7 extending between the beam 3 and the sensor chip 4 form bridges over the gap. The backside layer 11 is then "stretched" between the chip 4, the beam 3 and said protective frame 14.

In a third step (FIG. 3C) according to the invention, the thermally insulating and mechanically supporting jointing substance 9 is applied in the gap from above. The jointing substance 9 preferably consists of an organic material, such as polyimide, which after thermosetting provides a strong bond between the sensor chip 4 and the beam 3. The backside layer 11 then prevents the jointing substance 9 from penetrating down onto the underside of the circuit. As shown in FIG. 3C, there is also applied in connection with the application of the polyimide, a thin layer of the same jointing substance over the sensor chip 4, the conductors 7 and the beam 3 and, in practice, this thin layer is formed over the entire semiconductor wafer which should later be broken up into separate sensors. Part of this layer can be maintained after completed manufacture in order to provide a protective layer for the flow sensor. At any rate, it is preferable that the jointing substance, at least at the location of the joint, projects slightly over the chip 4 and the beam 3 to ensure a strong interconnection of these parts. (See FIG. 3D).

In a final, fourth step (FIG. 3D) according to the invention, the backside layer 11 can be removed from the circuit or flow sensor, whereby the sensor chip 4 is supplied by the silicon beam 3 by means of the jointing substance 9 alone.

FIG. 3E is a top plan view of the finished flow sensor which, in addition to the above-mentioned parts, also includes a protective frame 12 which is fixed along fracture lines 13 to the base plate 1 at a distance from the silicon beam 3. This protective frame is intended to be broken apart at said fracture lines prior to using the flow sensor.

The invention must of course not be considered restricted to the embodiment described above and illustrated in the drawings, but may be modified in various ways within the spirit and scope of the patent protection as claimed. For instance, the flow meter may thus also be of a type in which the temperature of the sensor chip is maintained constant and the current flow through the heating resistor R thus varies in dependence upon the prevailing flow velocity. In this case, the measuring value is calculated on the basis of power consumption. Further, the semiconductor material may be other than silicon, e.g. GaAs, or combinations of different semiconductor materials. As an alternative, the jointing substance may be applied only over the top face of the wafer parts as a layer for holding the wafer parts together, such that no jointing substance is applied in the gap between the narrow sides of the wafer parts facing each other.

I claim:

1. A flow meter for measuring the flow velocity of a flowing gaseous or liquid medium, said flow meter comprising an integrated semiconductor circuit having a first wafer part (4) with a plurality of thin conductors thereon and adapted to be heated and disposed in the flowing medium, a second wafer part (3) with a plurality of thin electrical conductors thereon and adapted to be disposed in the flowing medium without being heated, a thermally insulating jointing substance (9) joining the waver parts (3, 4) for holding said first waver part (4) and said second wafer part (3) together such that the first wafer part (4) is supported by the second wafer part (3) by way of the jointing substance, and a plurality of thin electrical conductors (7) connecting electrical conductors on said first wafer part with electrical conductors on said second wafer part and having a limited cross-sectional area in the gap (8) to restrict thermal conduction by the conductors (7) from the first wafer part (4) to the second wafer part (3).

2. A flow meter as claimed in claim 1, wherein said jointing substance (9) is mechanically supporting for holding said wafer parts (3, 4) together and that said conductors (7) are so dimensioned that they have a negligible supporting function as compared with said jointing substance (9).

3. A flow meter as claimed in claim 1, wherein said jointing substance (9) is so applied in the gap (8) between the narrow sides (10) of said wafer parts which are facing each other that said wafer parts (3, 4) and said jointing substance (9) form a unit of substantially uniform thickness.

4. A flow meter as claimed in claim 1, in which said conductors (7) consist of flat metal conductors extending between said wafer parts, and in which said conductors directly engage said jointing substance (9).

5. A flow meter as claimed in claim 3, wherein said jointing substance (9), apart from being applied over said gap, is applied as a thin protective layer over said conductors (7) and on part of one flat side of said wafer parts (3, 4).

6. A flow meter as claimed in claim 1, wherein said jointing substance (9) is an organic material, such as polyimide.

7. A flow meter as claimed in claim 1, wherein at least one of said wafer parts in the circuit has means (R) for heating said wafer part (4), said means (R) being driven via said conductors (7) connected to said wafer part (3).

8. A flow meter as claimed in claim 1, wherein at least one of said wafer parts in the circuit has means (D1, D2) for measuring the temperature of said wafer part.

9. A flow meter for measuring the flow velocity of a flowing gaseous or liquid medium, said flow meter comprising an integrated semiconductor circuit having a first wafer part (4) having a plurality of thin conductors thereon and adapted to be heated and disposed in the flowing medium, a second wafer part (3) having a plurality of thin electrical conductors thereon and adapted to be disposed in the flowing medium without being heated, a thermally insulating jointing substance (9) in the gap (8) between the wafer parts (3, 4) for holding said first wafer part (4) and said second wafer part (3) together such that the first wafer part (4) is supported by the second wafer part (3) and the jointing substance, and a plurality of thin electrical conductors (7) connecting electrical conductors on said first wafer part with electrical conductors on said second wafer part and having a total cross-sectional area in the gap (8) substantially equal to the cross-sectional areas of the connected electrical conductors to restrict thermal conduction by the conductors (7) from the first wafer part (4) to the second wafer part (3).

* * * * *